US008643672B2

(12) United States Patent
Ishida et al.

(10) Patent No.: US 8,643,672 B2
(45) Date of Patent: *Feb. 4, 2014

(54) INSTANT MESSAGE ANALYTICS OF HISTORICAL CONVERSATIONS IN RELATION TO PRESENT COMMUNICATION

(75) Inventors: Ai Ishida, Yamato (JP); Daisuke Maruyama, Yamato (JP); Hiroshi Ouchiyama, Tokyo (JP); Takayuki Sato, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,716

(22) Filed: Apr. 16, 2012

(65) Prior Publication Data

US 2012/0257835 A1 Oct. 11, 2012

Related U.S. Application Data

(63) Continuation of application No. 12/793,785, filed on Jun. 4, 2010.

(30) Foreign Application Priority Data

Jun. 15, 2009 (JP) .................................. 2009-141751

(51) Int. Cl.
*G09G 5/00* (2006.01)
(52) U.S. Cl.
USPC .......................................... 345/629; 345/619
(58) Field of Classification Search
None
See application file for complete search history.

(56) References Cited

U.S. PATENT DOCUMENTS

| 6,470,356 | B1 | 10/2002 | Suzuki |
| 6,956,593 | B1* | 10/2005 | Gupta et al. ................... 715/751 |
| 8,022,997 | B2 | 9/2011 | Shingu et al. |
| 8,401,771 | B2 | 3/2013 | Krumm et al. |
| 2005/0280651 | A1 | 12/2005 | Geddes |
| 2008/0259184 | A1* | 10/2008 | Shingu et al. ............ 348/231.99 |
| 2009/0210779 | A1* | 8/2009 | Badoiu et al. ................. 715/230 |

FOREIGN PATENT DOCUMENTS

| JP | 2000099524 A | 4/2000 |
| JP | 2005173061 A | 6/2005 |
| JP | 2006074514 A | 3/2006 |
| JP | 2008287691 A | 11/2008 |
| JP | 2009048381 A | 3/2009 |

* cited by examiner

*Primary Examiner* — Jwalant Amin
(74) *Attorney, Agent, or Firm* — Cuenot, Forsythe & Kim, LLC

(57) ABSTRACT

Evaluating a delivered video using a marker. A marker can be generated to be superimposed and displayed on an evaluation range from coordinate values specifying the evaluation range input to evaluate the video and that adds the marker to the video and causing the video with the marker to be deliver. An image can be generated in the evaluation range at predetermined intervals starting from the input time of the coordinate values. A similarity between two images arranged in the order of time from the input time by comparing the two images can be calculated, and a determination can be made whether the similarity is within an allowable range. The time of one of the two images generated as an extinction time of the displayed marker can be selected when the similarity is determined to be not within the allowable range.

10 Claims, 14 Drawing Sheets

| | $\alpha_a$ | $\alpha_b$ | $\beta$ | $\gamma$ | EQUATION TO BE USED |
|---|---|---|---|---|---|
| NEAREST NEIGHBOR METHOD | 0.5 | 0.5 | 0 | -0.5 | EQUATION (2) |
| FURTHEST NEIGHBOR METHOD | 0.5 | 0.5 | 0 | 0.5 | EQUATION (2) |
| MEDIAN METHOD | 0.5 | 0.5 | -0.25 | 0 | EQUATION (2) |
| CENTROID METHOD | $n_a/n_c$ | $n_b/n_c$ | $-(n_a \cdot n_b)/n_c^2$ | 0 | EQUATION (3) |
| GROUP AVERAGE METHOD | $n_a/n_c$ | $n_b/n_c$ | 0 | 0 | EQUATION (3) |
| FLEXIBLE METHOD | $(1-\beta^*)/2$ | $(1-\beta^*)/2$ | $\beta^*$ | 0 | EQUATION (3) |
| WARD'S METHOD | $(n_x+n_a)/(n_x+n_c)$ | $(n_x+n_b)/(n_x+n_c)$ | $-n_x/(n_x+n_c)$ | 0 | EQUATION (3) |

FIG. 7

INSTANT MESSAGE ANALYTICS OF HISTORICAL CONVERSATIONS IN RELATION TO PRESENT COMMUNICATION

CROSS-REFERENCE TO RELATED APPLICATIONS

This application is a Continuation of U.S. application Ser. No. 12/793,785 filed on Jun. 4, 2010, which claims the benefit of Japan Application Serial Number 2009-141751 filed on Jun. 15, 2009, both of which are fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to electronic messaging systems. More particularly, the embodiments relate to evaluating an arbitrary scene of a delivered video by using a marker, and of controlling the display of the marker.

Along with the development of network techniques, e-learning, which is learning acquired through the use of personal computers or the like in education, has been widely used in the field of education. The e-learning has an advantage that it is possible to provide the same education also in a remote location in comparison with learning in a classroom.

While a lecture is given with the use of video in e-learning, a learner sometimes wants to know the content, importance, understandability, or the like of the lecture in advance. The same applies to the provider of the content, and the content provider sometimes wants to know detailed opinions of the learner.

BRIEF SUMMARY OF THE INVENTION

The embodiments disclosed within this specification relate to electronic messaging systems. More particularly, the embodiments relate to evaluating an arbitrary scene of a delivered video by using a marker, and of controlling the display of the marker.

Another embodiment of the present invention can include, within a system comprising a processor and a memory, a method of evaluating a delivered video using a marker. The method can include, with the processor, generating a marker to be superimposed and displayed on an evaluation range from coordinate values specifying the evaluation range input to evaluate the video, adding the marker to the video, and causing the video with the marker to be delivered, generating an image in the evaluation range at predetermined intervals starting from the input time of the coordinate values, calculating a similarity between two images arranged in the order of time from the input time by comparing the two images, and determining whether the similarity is within an allowable range, and selecting the time of one of the two images generated as an extinction time of the displayed marker in the case where the similarity is determined to be not within the allowable range.

BRIEF DESCRIPTION OF THE SEVERAL VIEWS OF THE DRAWINGS

FIG. 7 is a diagram illustrating parameters of the respective clustering methods.

DETAILED DESCRIPTION OF THE INVENTION

Figure 1:
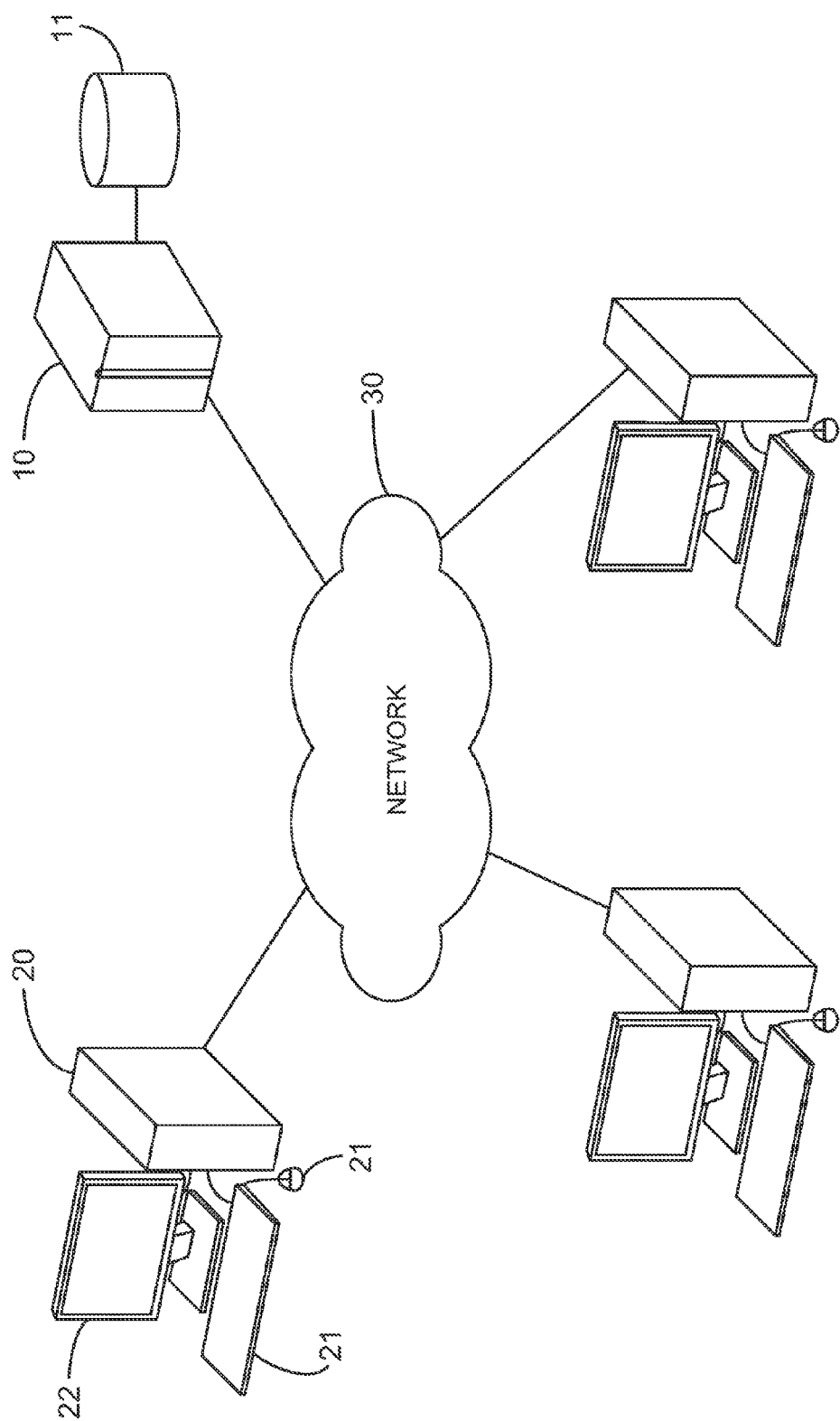
FIG. 1 is a diagram illustrating a configuration example of a network system including an evaluation system according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a configuration example of an evaluation system according to the present invention. The evaluation system can include a server 10, which can be connected to a plurality of client devices used by a plurality of users via a network 30. The client devices can be, for example, personal computers (PCs) 20. The client devices also may be communicatively linked to one another via the network 30. The network 30 can include the Internet, an intranet, a local area network (LAN), a wide are network (WAN), or any other suitable communication links. In this regard, the network 30 can include one or more routers, switches, access points, wireless access points, and/or the like.

The server 10 includes, as hardware, a storage device for storing a program and an operating system (OS) for executing processing of delivering a video, generating a marker displayed in an evaluation range from coordinate values specifying the evaluation range input in a certain scene of the video being delivered, adding the marker to the video and delivering it, calculating an extinction time of the marker, and stopping the marker addition and delivery, a CPU for reading the OS and the program from the storage device, and a network interface (I/F) for connecting to the network 30. In addition, the server 10 includes a memory control circuit for controlling the storage device, an I/O device for connecting to a DVD drive or a HDD, and other necessary devices. Moreover, the server 10 includes a database 11 and is able to store various video files into the database 11, receive a request from a PC 20, read the video file from the database 11, and deliver the video to the PC 20.

The database 11 stores an index in which each file name of a video file is associated with an address indicating a location where the file is stored. Receiving a request including a file name from the PC 20, the server 10 finds an address by referencing the index on the basis of the file name, reads the video file by accessing the address, and transfers the video file for immediate reproduction, thereby enabling the delivery of the video. The method of transferring and immediately reproducing the video file is referred to as streaming.

Similarly to the server 10, the PC 20 includes a storage device for storing applications such as a Web application and video reproduction software in addition to the OS, a CPU for reading and executing the OS and the applications from the storage device, a network I/F for connecting to the network 30, an input device 21 such as a mouse or a keyboard for performing an input operation for adding a marker and a display device 22 for displaying a streamed video. The PC 20 also has a memory control circuit and an I/O device.

If a user issues a request for a video file for learning from the PC 20 to the server 10 to carry out e-learning, the server 10 finds and transfers the video file, by which the PC 20 streams the video such as a lecture scene and reproduces the video on the screen of the display device 22 provided for the PC 20 through the above applications. The request issued from the PC 20 includes a file name, an IP address for identifying the PC 20, a MAC address, a computer name, and the like. The server 10 delivers a video by using the requests.

Figure 2:
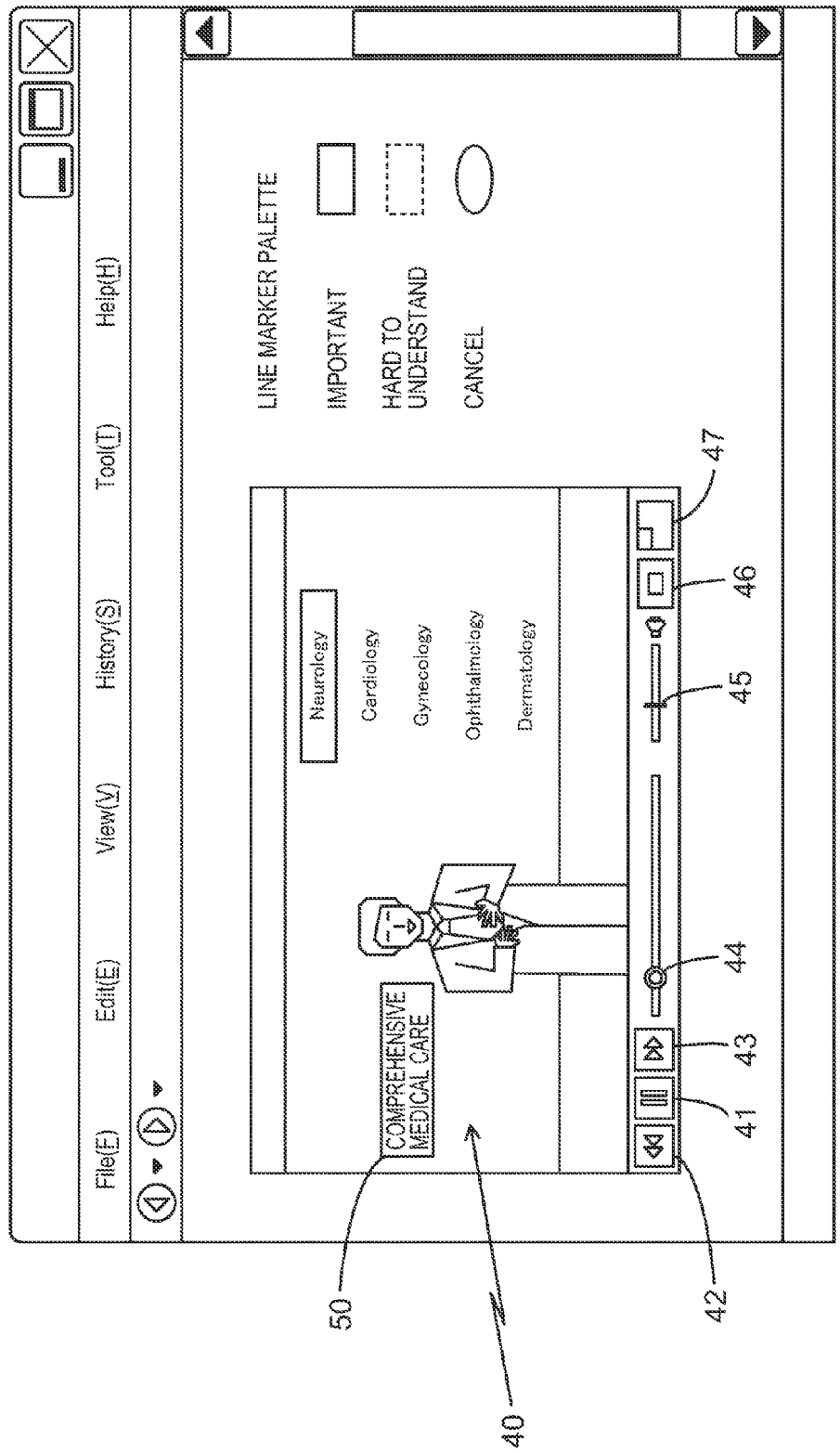
FIG. 2 is a diagram illustrating a situation where markers are added to a certain scene in a video.

As shown in FIG. 2, the screen of the display device 22 displays a delivered video 40, the Play/Pause button 41 for playing or pausing the video 40 (in FIG. 2, the Play/Pause button 41 is in the pause condition, but its mark changes to a triangle mark representing the play condition if the Play/Pause button 41 is clicked to release the pause on the video 40), a Fast Rewind button 42 for fast-rewinding the video 40, a Fast Forward button 43 for fast-forwarding the video 40, a play position slide bar 44, a volume slide bar 45, a screen magnification button 46, a screen reduction button 47, and the like. In addition, a mouse pointer which is not shown is displayed. These buttons are selectable by superimposing and pressing the pointer on the buttons.

A user is able to add a marker 50 by using the mouse to identify important characters or the like written on a blackboard by a lecturer giving a lecture during reproduction of the video 40. It is similar to that the user adds a marker on a textbook or the like by using a highlighter. The user is able to add the marker 50 by bringing the mouse pointer to a starting point of adding the marker 50, bringing the mouse pointer to an end point with the mouse button pressed down, and releasing the mouse button at the end point.

The marker 50 is able to be represented as, for example, a semitransparent rectangular region. The marker 50 may have any color as long as it is recognizable that the marker 50 is added and the characters or the like written by the lecturer are visible through the marker 50. The rectangular region to which the marker 50 is added is the evaluation range. In FIG. 2, the marker 50 represented by a semitransparent rectangle is added to two character strings written on the blackboard behind the lecturer.

The marker 50 is not limited to the semitransparent rectangle, but may be a simple line and displayed as an underline.

The coordinate values of the starting point of the marker 50, the coordinate values of the end point thereof, and the time at which the user completes to add the marker 50 are transmitted from the PC 20 to the server 10. The server 10 receives the data as input data, generates the marker 50 on the basis of the coordinate values, adds the marker 50 to the video and transfers it, and immediately causes the marker 50 to be displayed on the display device 22 for the PC 20. Then, the server 10 determines the time at which the marker 50 is extinguished and stops adding and transferring the marker 50 at the time point to extinguish the display of the marker 50.

In FIG. 2, the user is able to select one of two evaluation levels such as "important" and "hard to understand" for the marker 50 and is able to add the marker 50 corresponding to one of the evaluation levels to an arbitrary portion by selecting the evaluation level. These are able to be identified by, for example, colors.

Figure 3:
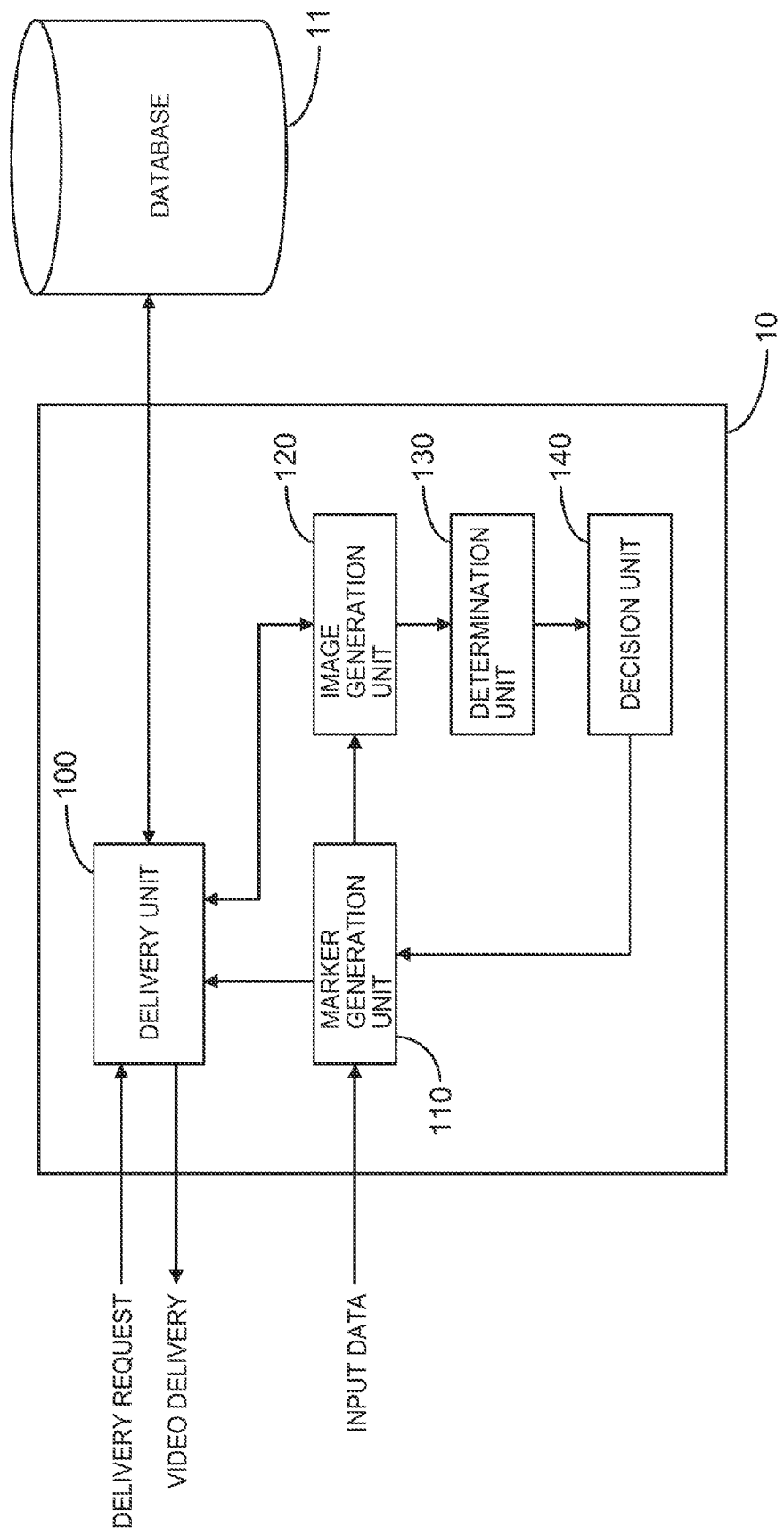
FIG. 3 is a functional block diagram illustrating one embodiment of the evaluation system.

In order to perform the above processing, it is assumed that the server 10 has a configuration shown in the functional block diagram of FIG. 3. The server 10 includes a delivery unit 100, which finds a desired video file in response to a request from the PC 20 and delivers or streams the video file to enable simultaneous transfer and reproduction thereof, and a marker generation unit 110, which generates a marker to be superimposed and displayed on an evaluation range from coordinate values specifying the evaluation range input to evaluate a certain scene during the video streaming, adds the marker to the video, and causes the delivery unit 100 to deliver the video with the marker.

Moreover, the server 10 includes an image generation unit 120, which generates an image in the evaluation range at predetermined intervals starting from the input time of the coordinate values, a determination unit 130, which calculates a similarity between two images arranged in the order of time from the input time by comparing the two images and determines whether the similarity is within an allowable range, and a decision unit 140, which decides the time of one of the two images generated earlier as an extinction time of the displayed marker if the similarity is determined to be not within the allowable range.

If the similarity is determined to be not within the allowable range, the decision unit 140 decides the extinction time and notifies the marker generation unit 110 of the extinction time to stop the marker addition and to extinguish the marker from the delivered video. On the other hand, if the similarity is determined to be within the allowable range, the image generation unit 120 generates an image at the time after an elapse of a predetermined time from the input time and an image at the time after an elapse of a further predetermined time from the foregoing time, and the determination unit 130 repeats the processing of calculating a similarity between these two images and determining whether the similarity is within the allowable range until the determination unit 130 determines that the similarity is not within the allowable range.

The CPU can function as these units by reading and executing the program. Hereinafter, these units will be described in detail.

The delivery unit 100 specifies a video file from the PC 20 operated by the user, receives a transmitted video delivery request, and searches the database 11 on the basis of a file name for identifying the video file included in the video delivery request. For the video file, the file name is associated with an address at which the video file is stored and they are stored as an index. Therefore, it is possible to find the address at which the video file is stored by referencing the index on the basis of the file name in searching and to stream the video by reading data on the basis of the address and transferring and reproducing the data.

If the user specifies coordinate values for adding a marker to the video which is being delivered, the PC 20 transmits the coordinate values to the server 10. While the coordinate values are specified, a transfer of the video file is stopped and the video is paused. The marker generation unit 110 generates a marker to be superimposed and displayed on the evaluation range from the coordinate values specifying the evaluation range input to evaluate the scene at that time. If the marker is made of a semitransparent rectangular region, at least the coordinate values of the starting point and the coordinate values of the end point are transmitted. Then, the marker generation unit 110 receives those coordinate values and generates the marker from the coordinate values. The coordinate values are assumed to be, for example, in the two-dimensional coordinate system with the lower left corner of the screen at (0, 0) and the coordinate values in the x-axis direction and in the y-axis direction can be represented by the number of pixels.

The marker generation unit 110 adds the generated marker to the video by superimposing the marker on the video and the delivery unit 100 delivers the video with the marker added thereto. More specifically, the marker generation unit 110 adds marker data to the video file, the delivery unit 100 transfers it to the PC 20, and the PC 20 reproduces it to display the video with the marker superimposed thereon. The marker data includes data specifying the shape, size, and the arrangement position generated from the coordinate values included in the input data and includes information on the color indicating an evaluation level and the transparency included in the input data.

The image generation unit 120 generates a snapshot which is an instantaneous image of the evaluation range specified by the coordinate values at the input time from the coordinate values and the input time thereof included in the input data by using the video file stored in the database 11 and currently delivered. The input time is the time elapsed from the start of the video. In addition, the image generation unit 120 generates a snapshot of the evaluation range at the time after an elapse of a preset time. These snapshots can be easily generated by cutting out the image in the evaluation range from the image obtained when the video is paused at the time from the start of the video file. In this manner, the snapshot at each time is generated.

The determination unit 130 calculates the similarity between the two snapshots. Assuming that t is the input time, the time after an elapse of a predetermined time is represented by t+1. The similarity between the images can be calculated by any conventionally known method. For example, the similarity can be calculated by using DCT clustering, a color histogram method, a contour extraction method, a quadtree method, or the like.

For the DCT clustering, there is a cut detection method using clustering with DCT components. In this method, a cut point is found as a point for dividing two formed clusters by forming a continuous frame cluster on the basis of a property that the adjacent frames belonging to the same shot are similar to each other, instead of detecting a cut by finding a change between adjacent frames. A method of converting an image to a frequency region is considered to be efficient to know a general structure of the frame. As one of the methods of conversion to the frequency region, it is possible to use a discrete cosine transform (DCT).

While having advantages that considerably fine changes can be captured and that the accuracy of cut detection is high, this method has a disadvantage of misidentifying a change which has an effect only in pixel values such as a blinking scene or the like because the method uses pixel values.

The color histogram method is to recognize a new cut if the total of the absolute value differences between pixels reaches a certain threshold value or greater by using a color histogram where the RGB space is divided into 4096 colors. More specifically, when a comparison is made with respect to a similarity between two images, the number of pixels per luminance value is obtained for the two images and differences between the images are added up and obtained with respect to R (red), G (green), and B (blue). Then, a smaller value of the sum is determined to indicate the higher similarity in the color histogram method. This method has an advantage that it is easier to calculate than DCT clustering and high in extraction rate. On the other hand, it has a disadvantage of misidentifying the blinking scene which largely changes in color in the same manner as for the DCT clustering and the misidentification is more remarkable than DCT clustering.

The contour extraction method is to extract a cut independently of color information, unlike DCT clustering and color histogram. In this method, first, the coordinates from the upper left corner at the origin are obtained with respect to each of the points constituting the contour. The coordinates are added up for each of the x axis as the horizontal axis and the y axis as the vertical axis and lastly the total is divided by the number of points constituting the contour to obtain the average of the contour of the video picture, namely the center of gravity of the video picture. The obtained centers of gravity of the video pictures are compared to each other to extract a cut. If the video pictures have continuity, there is not so large change. If there is a change, the centers of gravity are significantly different from each other. Therefore, a desired result is achieved.

This method produces an excellent result in the case of extracting a scene requiring a comparison in a long time width since the calculation for comparison and verification of continuity is actually performed by a simple comparison in the center of gravity. The method, however, has a disadvantage of being weak against such a change that a cut is extracted many times for a short period of time. The method, however, can be thought to be able to prevent misidentification by error correction such that a cut is not identified if there is another cut within neighboring several frames as error correction since the video is visually unnatural, and therefore it is thought to be useful.

The quadtree method is an automatic division method, in which an element including the contour of the analysis model is subdivided into four elements and in which tree structures are formed and compared with each other, thereby enabling calculation of similarities. This method will be described in detail below with reference to the images depicted in FIGS. 4A and 4B.

Figure 4A:
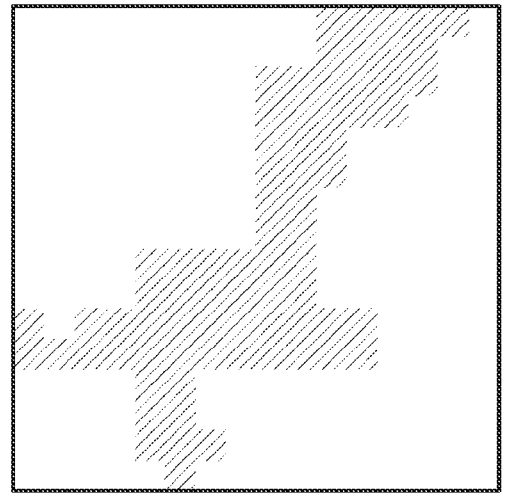
FIG. 4 is a reference drawing used to calculate a similarity.
Figure 4B:
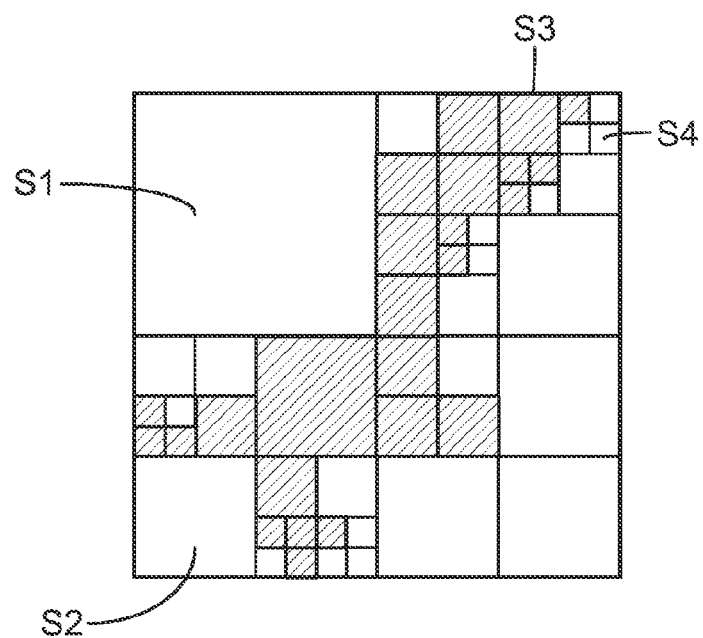

For the image shown in FIG. 4A, first, color reduction is performed. Color reduction is the process of reducing the number of colors in an image, which includes the process of selecting optimum N typical colors and the process of deciding the correspondence between the pixel values and the N typical colors. For the former selection process, for example, a uniform quantization method or a tapered quantization method can be used. As the tapered quantization method, there is a median cut method of dividing a rectangular parallelepiped, which is circumscribed about color distribution in the RGB space of the image, into two parts in such a way as to divide the total number of pixels of the image equally by an axis parallel to the longest side of the rectangular parallelepiped among the three RGB axes, subdividing the rectangular parallelepiped by repeating this process, generating N rectangular parallelepipeds each having the same number of pixels, and considering the average of the color data in the rectangular parallelepipeds as a representative color. For the latter decision process, for example, there is a method of selecting a color closest to each pixel of the image.

After the color reduction is performed, a snapshot is divided into four parts, more specifically in half both vertically and horizontally. If each region is entirely occupied by a graphic area or includes no graphic area like a region S1 shown in FIG. 4B, the division is stopped there.

If a quarter of the original region includes a graphic area though not entirely, the quarter is further divided into four parts and the same determination is performed. If a region is entirely occupied by a graphic area or includes no graphic area like a region S2, the division is stopped there. This process is repeated until the division is stopped. In this specification, the region S2 is divided into regions S3 and the region S3 is further divided into regions S4, by which all of the regions are occupied by a graphic area or include no graphic area, and the process is then terminated.

A result obtained as described above is able to be described as a tree structure and it is possible to calculate the similarity which indicates the degree of similarity such as, for example, 60% and 70% by comparing the tree structures.

The determination unit 130 holds a threshold value for determining whether the similarity is within the allowable range and determines whether the similarity is equal to or more than the threshold value. If it is equal to or more than the threshold value, the determination unit 130 determines that the two images are similar. If it is less than the threshold value, the determination unit 130 determines that the two images are not similar. If the determination unit 130 determines that the images are similar, it calculates the similarity between the next two images to determine whether the similarity is within the allowable range again. More specifically, first, the determination unit 130 calculates the similarity between the image at time t and the image at time t+1. If the similarity is equal to or more than the threshold value, the determination unit 130 then calculates the similarity between the image at time t+1 and the image at time t+2 to determine whether the similarity is equal to or more than the threshold value. If the similarity is still equal to or more than the threshold value, the determination unit 130 calculates the similarity between the image at time t+2 and the image at time t+3 and thus repeats the same processing.

On the other hand, if the determination unit 130 determines that the similarity is not within the allowable range, it suggests that the images are not similar and therefore the decision unit 140 decides the time of one of the two images generated earlier as an extinction time f when the marker is extinguished. The decision unit 140 sets the extinction time f and the marker generation unit 110 stops the addition of the marker to the video at the set extinction time f. Thereby, the marker added by the user is extinguished at the determined extinction time.

Figure 5:
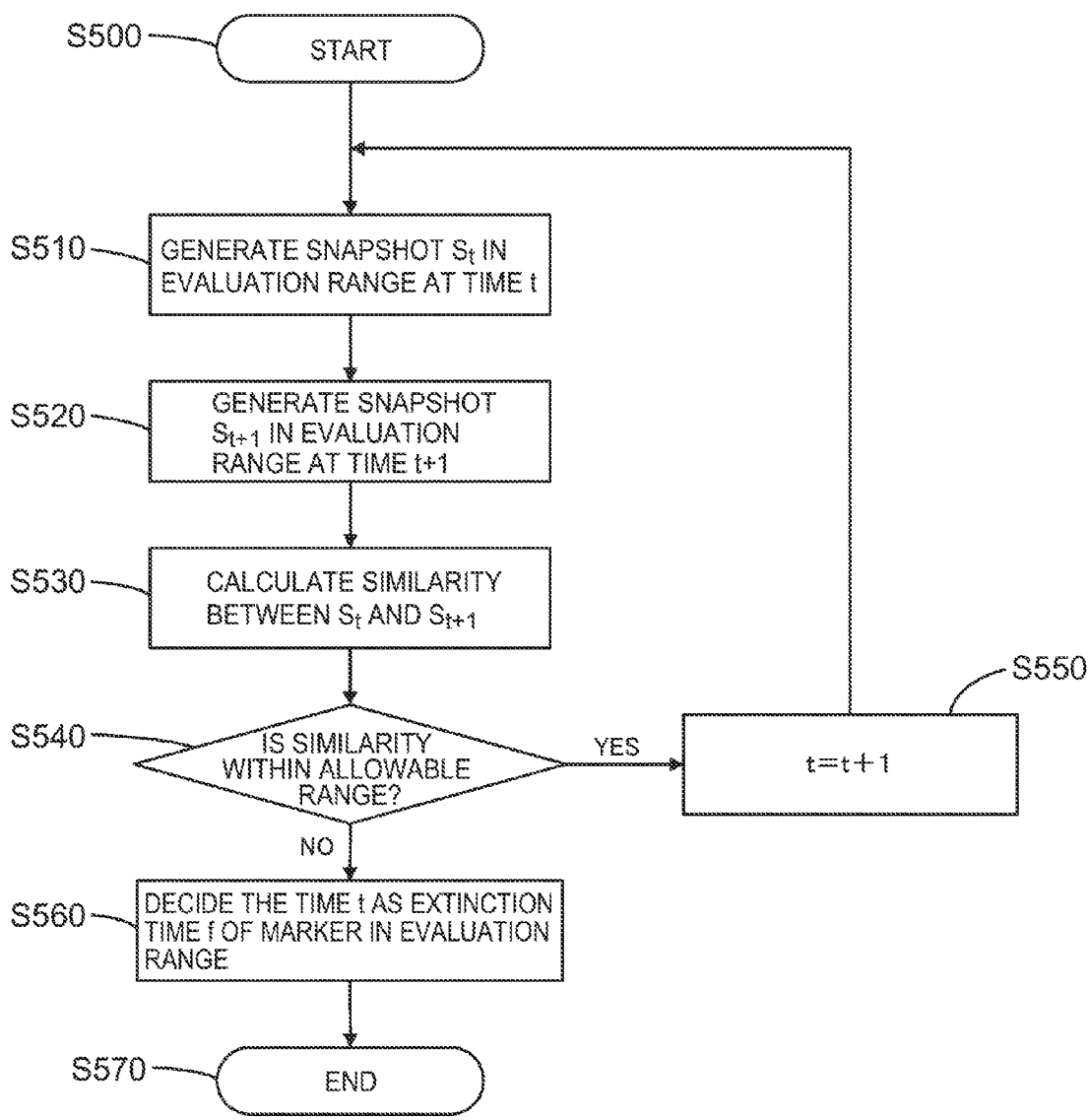
FIG. 5 is a flowchart illustrating a flow of processing of determining the lifetime of marker display.

The process of controlling the marker display by the server 10 will be described in detail with reference to the flowchart shown in FIG. 5. This process is performed to decide the lifetime of the evaluation range in which the marker is automatically extinguished. First, a Web application is activated on the screen of the display device 22 for the PC 20 to display a log-in screen. A user able to receive this service is previously registered and gets a user ID and a password. Therefore, the user inputs the already acquired user ID and password in the log-in screen to start the service.

The user selects one of the video files and requests for the delivery of the video. Then, the request is transmitted to the server 10 via the network 30. The server 10 reads the video file from the database 11 managed by the server 10 on the basis of the file name included in the request and delivers the video by using the IP address or the like of the PC 20 included in the request.

Upon the delivery of the video, the application for reproducing the video is activated and the video is reproduced on the screen, by which the user is able to view the video. In order to add a marker to characters or the like which seem to be important by using a mouse or the like at a place in which the user is interested, the user moves the pointer to a position to be a starting point, presses the mouse button, moves the cursor to a position to be an end point with the mouse button kept pressed, releases the mouse button, and transmits the coordinate values and the input time thereof as input data to the server 10.

If, for example, the screen has 1024 pixels vertically by 768 pixels horizontally with the pixel at the lower left corner of the screen as the coordinates (0, 0), the coordinate values is able to be composed of x- and y-axis values on a two-dimensional representation such as the starting point (500, 300) and the end point (600, 350). The input time can be assumed to be time t elapsed from the reproduction start time of the video set to 0, where the video is reproduced until then. While the user manipulates the mouse pointer, the video is stopped and therefore the time is stopped during the manipulation.

The input data input as described above is transmitted to the server 10 and the server 10 receives the input data. Thereupon, the control starts the process of step 500. In step 510, the server 10 reads the coordinate values R(x, y) and time t included in the input data, generates an instantaneous image at the time t from the video file, and generates a snapshot St in the evaluation range specified by the coordinate values from the instantaneous image. The coordinate values R(x, y) include the coordinate values of the starting point and the end point.

Next, in step 520, a snapshot $S_t+1$ at time t+1 after an elapse of a preset time from the time t is generated in the same manner. In step 530, the similarity between the snapshot $S_t$ at the time t and the snapshot $S_t+1$ at the time t+1 is calculated. The similarity is able to be calculated by the method exemplified in the above.

In step 540, it is determined whether the calculated similarity is within the allowable range. If the similarity is within the allowable range, the control proceeds to step 550 to indicate that the two images are similar to each other and the time is set to t+1. Returning to step 510, the snapshot $S_t+1$ at time t+1 is generated again. In step 520, a snapshot $S_t+2$ at time t+2 is generated. Then, in step 530, the similarity is calculated. In step 540, it is determined whether the similarity is within the allowable range.

On the other hand, if it is determined that the calculated similarity is not within the allowable range in step 540, the two images are not similar to each other, which therefore indicates that a change occurs in the snapshot between the time t and the time t+1. Accordingly, the control proceeds to step 560, where the time t is decided to be an extinction time f when the marker is extinguished since the similarity is within the allowable range until the time t and the extinction time f is set. Thereafter, in step 570, the process is terminated. This setting causes the marker generation unit 110 to stop the marker addition at the time t and therefore the marker is automatically extinguished from the video delivered by the delivery unit 100.

As described above, whether the similarity is within the allowable range is determined because a significant change is very likely to occur between the two images if the similarity is not within the allowable range. The change occurs, for example, in a situation where a scene changes or where characters to which the marker is added are erased or rewritten.

Although the foregoing detailed description has been made for the system configuration and the processing for determining the lifetime of the evaluation range in which the marker is automatically extinguished, it is also possible to merge and display markers added by a plurality of users in addition to the above. This enables the provision of GUI which accumulates evaluations and presents information on what of which scene is how evaluated. More specifically, it is possible to present which part of the image at which time is important or hard to understand.

Figure 6:
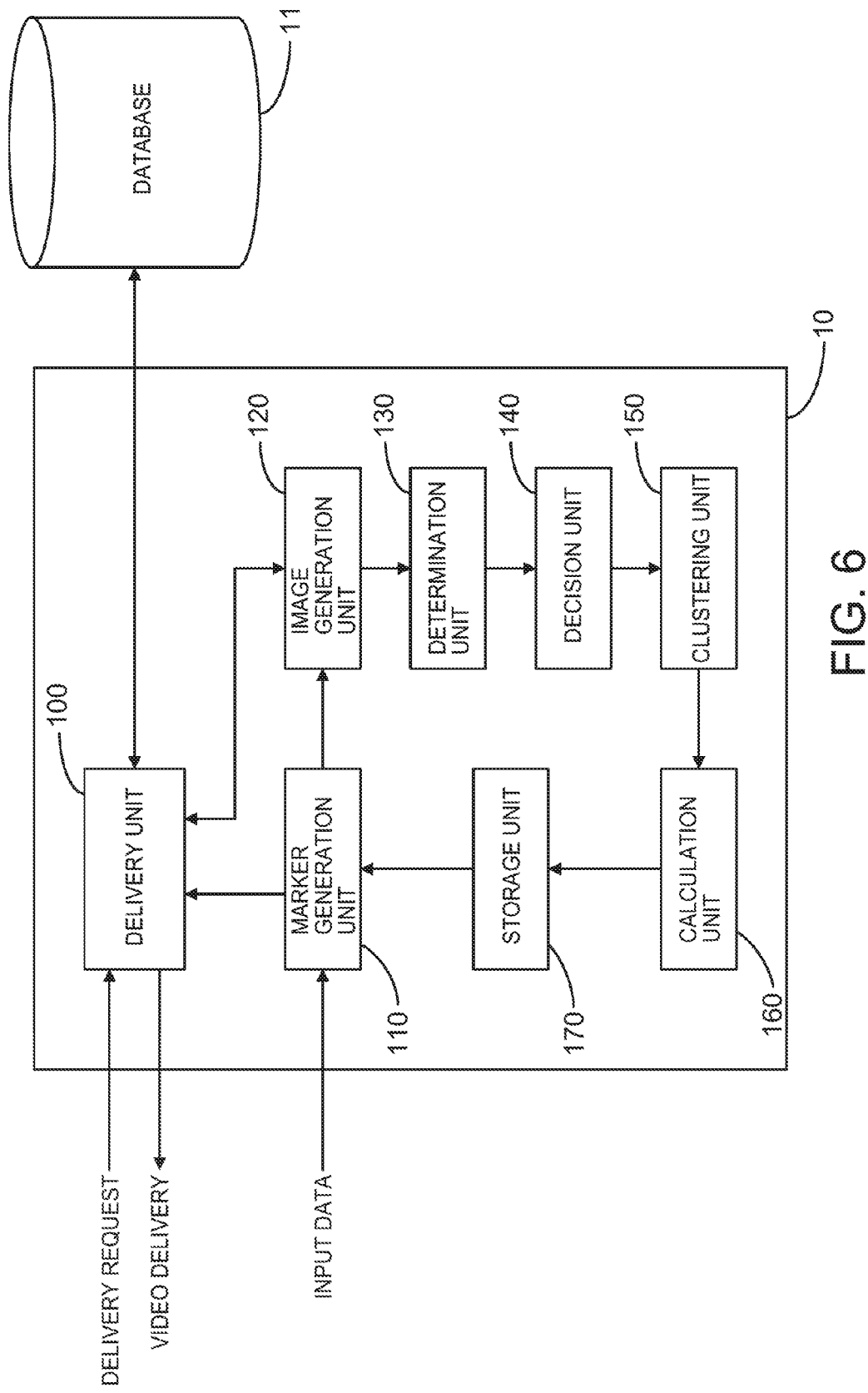
FIG. 6 is a functional block diagram illustrating another embodiment of the evaluation system.

Referring to FIG. 6, there is shown a configuration further including a clustering unit 150 for clustering evaluation objects including the coordinate values R(x, y), the input time t, and the extinction time f as feature values by using the feature values, a calculation unit 160 for calculating averages of the future values included in the evaluation objects clustered in the same cluster, and a storage unit 170 for storing the calculated averages as evaluation information, in addition to the configuration shown in FIG. 3.

The clustering unit 150 clusters (classifies) the evaluation objects by a known clustering method. In this clustering, data close to each other in the feature space is grouped by using six parameters of the coordinate values $(x_i, y_i)$ of the starting point, the coordinate values $(x_2, y_2)$ of the end point, the input time t, and the extinction time f of the evaluation range included in the evaluation object as feature values. As a method therefor, the following conventionally-known method can be adopted.

If it is assumed that there are n evaluation objects to be evaluated, each evaluation object has six parameters and therefore has six-dimensional feature values. First, it is assumed that each cluster includes one evaluation object and there are n clusters as the initial state.

Subsequently, the Euclidean square distance $d_{i,j_2}$ between two clusters is calculated by using the equation 1 shown below. The Euclidean square distance is one of the methods of measuring a distance between clusters. In addition, there are the Euclidean distance, the normalized Euclidean distance, the Minkowski distance, the Mahalanobis' distance, and the like. Although it is also possible to use these distances, the foregoing Euclidian square distance is generally used.

$$d_{ij}^2 = \sum_{k=1}^{p} (x_{ik} - x_{jk})^2 \quad (i, j = 1, 2, \ldots, n) \quad [\text{Eq. 1}]$$

In the equation (1), p is the number of dimensions and is 6 here. Moreover, X is a feature value such as a coordinate value, an input time, or an extinction time.

Next, clusters closest to each other in the Euclidean square distance $d_{i,j}^2$ are merged and considered to be one cluster. For example, it is assumed that a cluster "a" and a cluster "b" are merged and thereby a cluster "c" is formed. If $d_{ab}$, $d_{xa}$, and $d_{xb}$ are distances between clusters before the cluster "a" and the cluster "b" are merged, the distance between the cluster "c" and the cluster "x" (x is different from a and b) after the merge is expressed by the following equations (2) and (3):

$$d_{xc} = \alpha_a d_{xa} + \alpha_b d_{xb} + \beta d_{ab} + \gamma |d_{xa} - d_{xb}| \quad [\text{Eq. 2}]$$

$$d_{xc}^2 = \alpha_a d_{xa}^2 + \alpha_b d_{xb}^2 + \beta d_{ab}^1 + |d_{xa}^2 - d_{xb}^2| \quad [\text{Eq. 3}]$$

The values of $\alpha_a$, $\alpha_b$, $\beta$, and $\gamma$ in the equations (2) and (3) and which should be used between the equations (2) and (3) depend on an adopted method. These parameters are shown in the table of FIG. 7. In FIG. 7, $n_a$ is the number of individuals included in the cluster "a" and $n_b$ is the number of individuals included in the cluster "b." $n_c$ equals $n_a + n_b$, and $n_x$ is the number of individuals included in a cluster other than the clusters "a" and "b" to be merged. $\beta^*$ is an arbitrary value less than 1.

If two clusters are merged into one cluster as described above, the total number of clusters decreases by one. This calculation is repeated to decrease the number of clusters. The calculation is repeated until the number of clusters reaches 1.

Then, the cluster not exceeding a preset Euclidean distance $d_{i,j}$ is considered to be one unit of the evaluation information (EvalInfo).

The calculation unit 160 calculates the averages of the evaluation objects belonging to EvalInfo obtained as described above to determine the averages of the coordinate values, the input time, and the extinction time.

The evaluation object includes an evaluation point in addition to the coordinate values, the input time, and the extinction time. The evaluation point may be provided in terms of the number of points such as, for example, 60 points, though not limited thereto. The calculation unit 160 calculates an attention degree by averaging the evaluation points included in the evaluation objects belonging to EvalInfo clustered in the same cluster and dividing the average by a total evaluation point obtained by adding up the evaluation points included in all clusters.

Moreover, the evaluation object includes an evaluation level allocated according to the evaluation content. The evaluation level may be represented by a numerical value such as "1" for "important" or "2" for "hard to understand." The clustering unit 150 performs the clustering for each evaluation level and the calculation unit 160 is able to calculate the average for each evaluation level.

The calculation unit 160 is able to store the calculated result as an evaluation result of the plurality of users into the storage unit 170, by which the evaluation information can be updated. The result is able to be added to the video and delivered in response to a request for displaying the evaluation result of the plurality of users upon receiving the request.

More specifically, upon receiving the request, the marker generation unit 110 reads the stored average from the storage unit 170 in response to the request, generates a marker by using the average, adds the generated marker to the video, and causes the video with the marker to be delivered.

Figure 8:
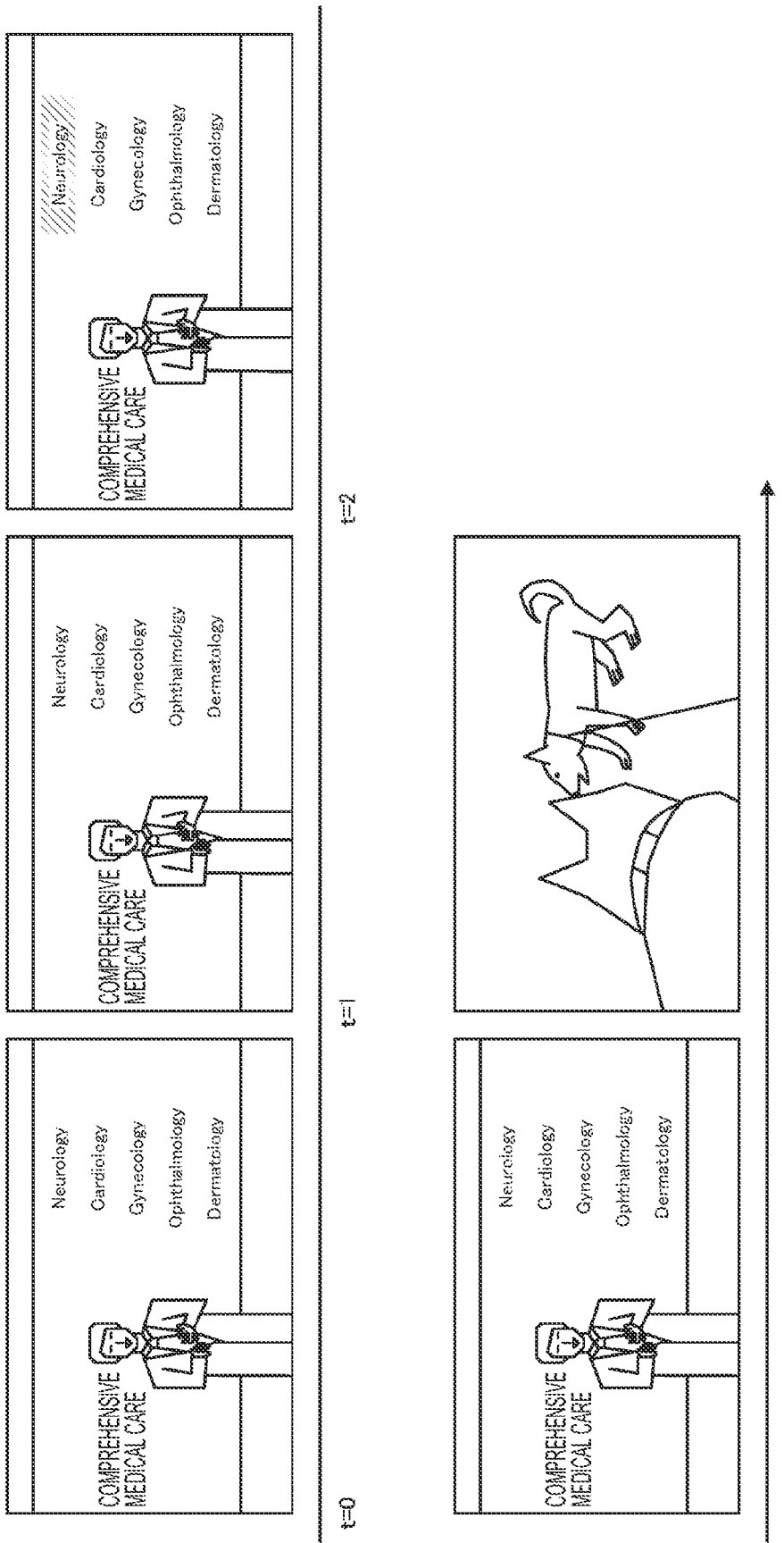
FIG. 8 is a diagram illustrating a situation where a user A adds a marker to the video.
Figure 9:
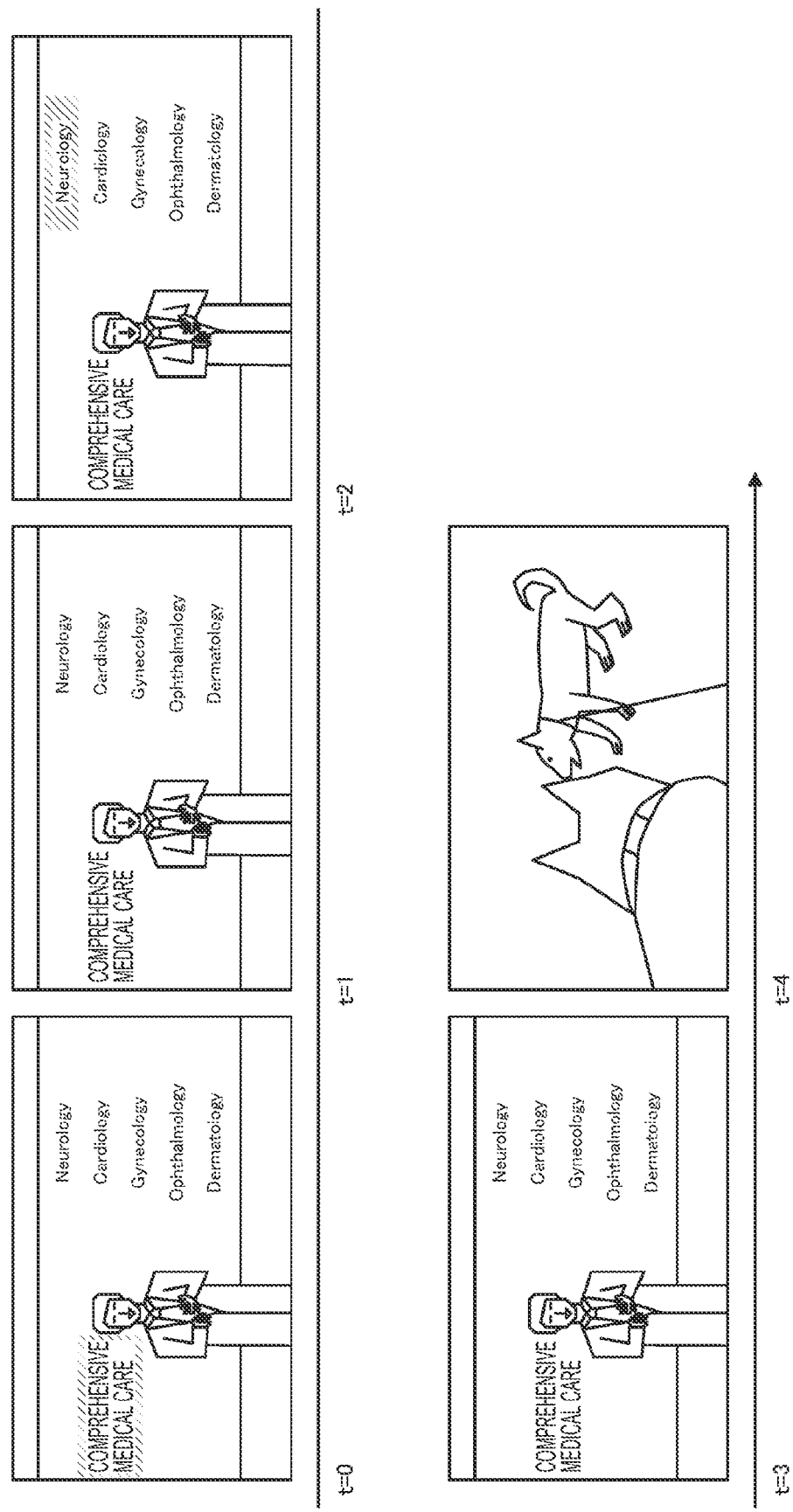
FIG. 9 is a diagram illustrating a situation where a user B adds a marker to the video.

For example, a user A is assumed to add a marker at time t=2 as shown in FIG. 8. For the same video, a user B is assumed to add a marker at time t=0 and time t=2 as shown in FIG. 9. Upon receiving an instruction of displaying the marker of only the user A, the marker generation unit 110 generates and adds the marker of only the user A and causes the delivery unit 100 to deliver the video with the marker. On the other hand, upon receiving an instruction of displaying the marker of all users, the marker generation unit 110 generates the marker from the above average and adds the marker to the video and causes the delivery unit 100 to deliver the video with the marker. In this situation, the marker of the user A and the marker of all the users may be delivered simultaneously and each user is able to view the markers at the same time.

Figure 10:
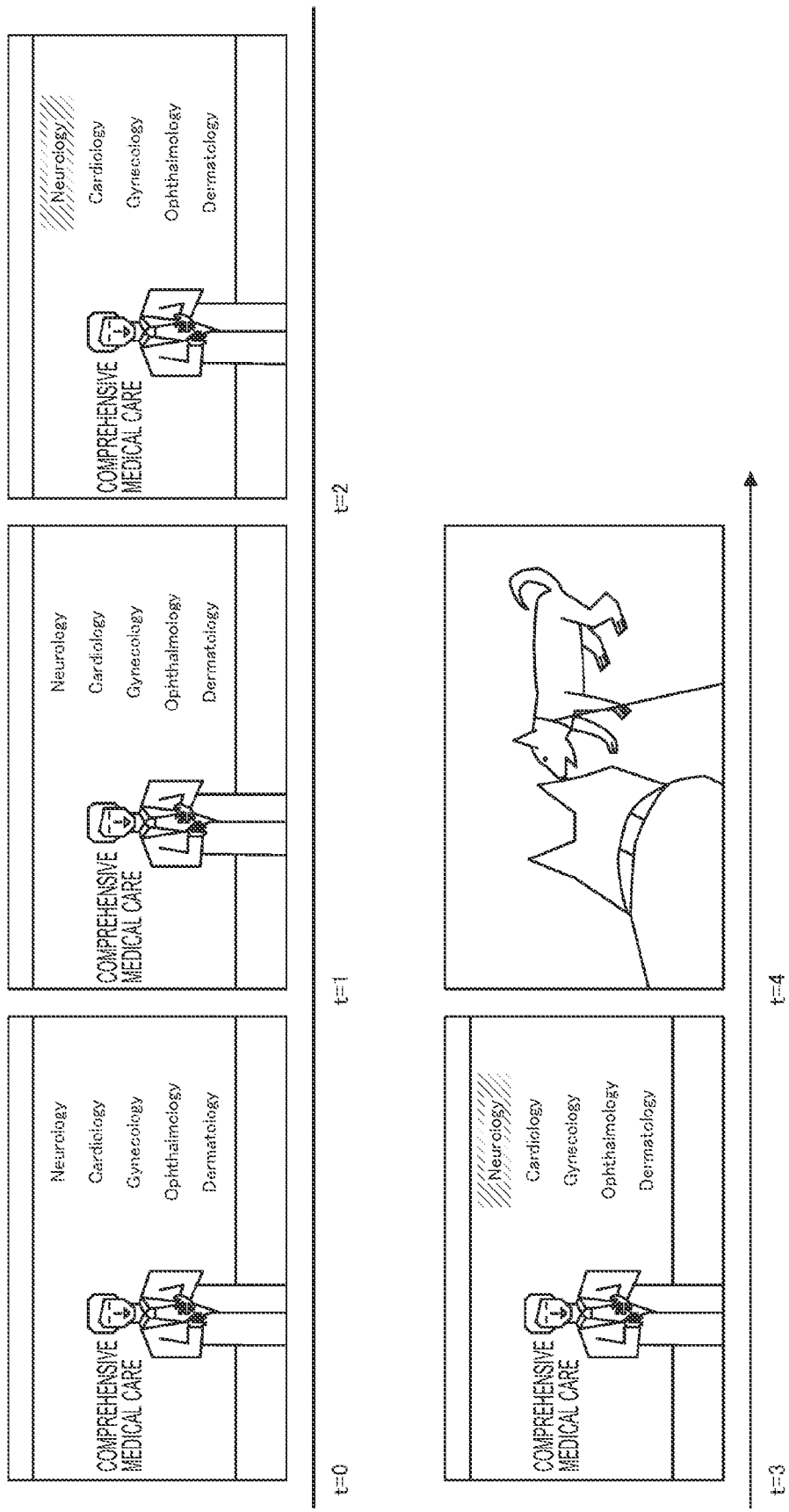
FIG. 10 is a diagram illustrating a situation where the marker of the user A is displayed.
Figure 11:
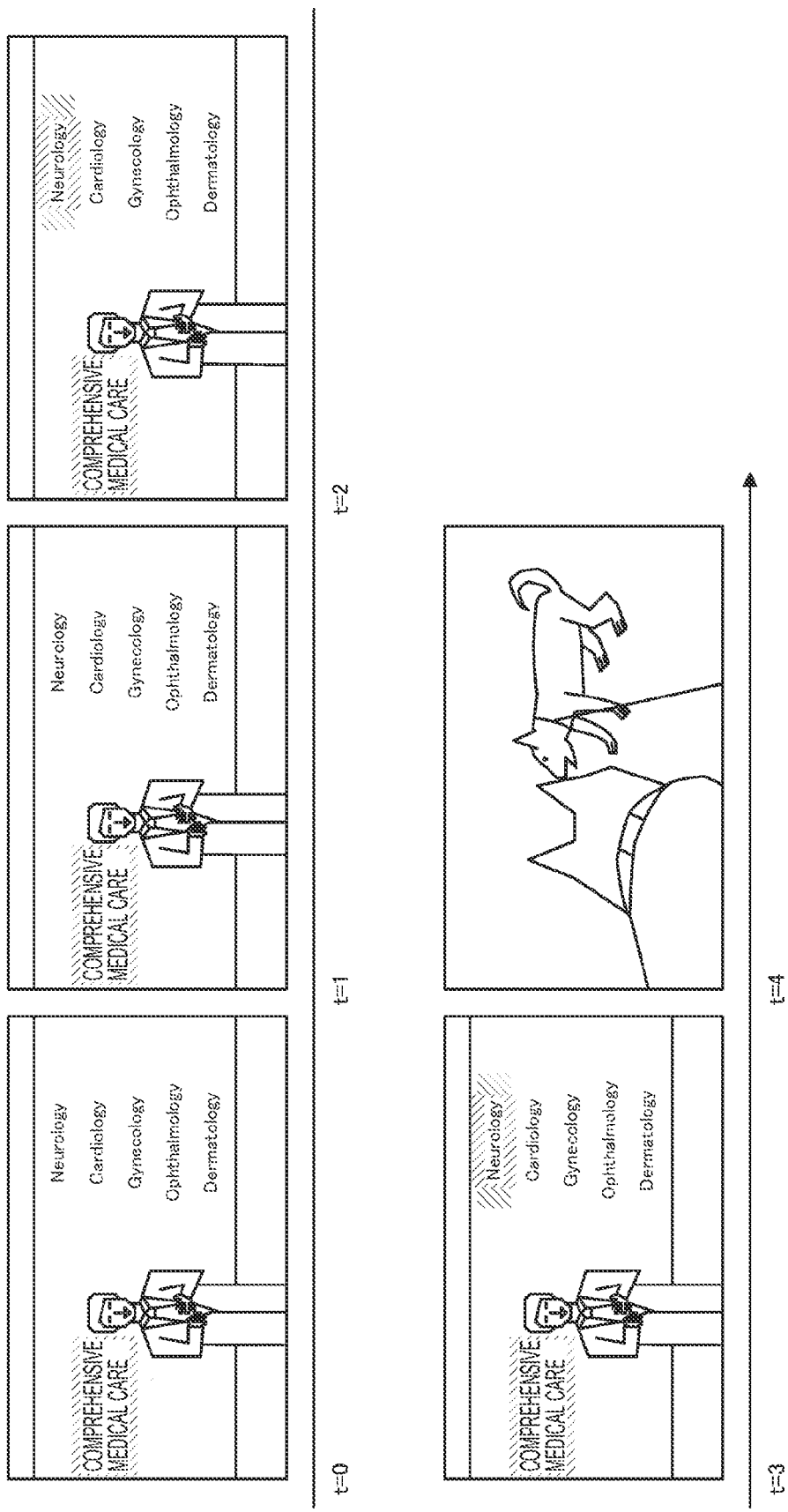
FIG. 11 is a diagram illustrating a situation where the markers of all the users are displayed at a time.

FIG. 10 shows the situation where the marker of only the user A is displayed and FIG. 11 shows the situation where the marker of the user A and the marker of all the users are displayed at a time. While the marker shown in FIG. 10 is added by the user A at time t=2, the marker is displayed until time t=3 immediately before time t=4 when the scene changes and is extinguished at the time t=4. The marker shown in FIG. 11 is displayed in such a way as to display the marker generated from the average of the evaluation objects of the markers added by all the users so as to include the marker added by the user B at time t=0 and to display the marker generated from the above average so as to include the marker added by the user B and the marker added by the user A at time t=2. At time t=4, all of the markers are extinguished due to a screen change. In FIG. 11, the markers are generated by using the average and therefore the marker is different from the marker of only the user B in the position, size, and the like.

Figure 12:
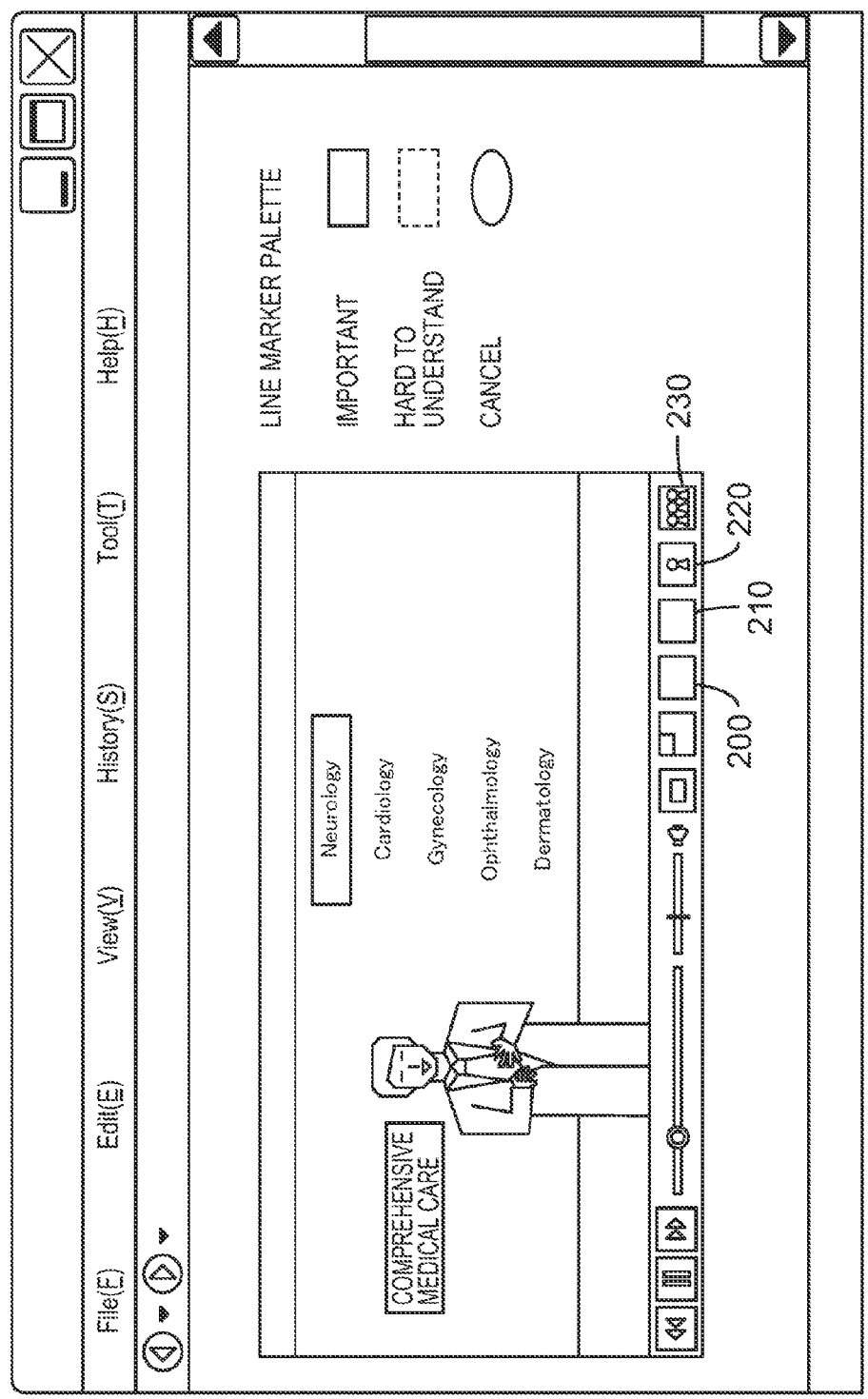
FIG. 12 is a diagram illustrating a display screen after switching the display mode.

The marker generation unit 110 is also able to generate a marker according to an evaluation level and add the marker to the video so as to be delivered. The evaluation level is selected by the marker selection by a user shown in FIG. 12, and it is included in the input data and transmitted to the server 10. Therefore, the server 10 is able to generate a marker based on the evaluation level depending on which evaluation level is selected and to add the marker to the video for delivery. The evaluation level is identifiable by the color. For example, a red marker is able to indicate that the information is "important" and a blue marker is able to indicate that the information is "hard to understand." They are selectable by selection buttons 200 and 210. In addition, FIG. 12 also shows selection buttons 220 and 230 which enable the selection of whether only the user's own marker is displayed or the marker of the plurality of user is displayed.

The marker generation unit 110 is able to change the marker according to the attention degree, to add the changed marker to the video, and to cause the video with the marker to be delivered. The attention degree indicates how many users are paying attention to the evaluation range and it is possible to make the attention degree identifiable by varying the thickness of the marker border.

Figure 13:
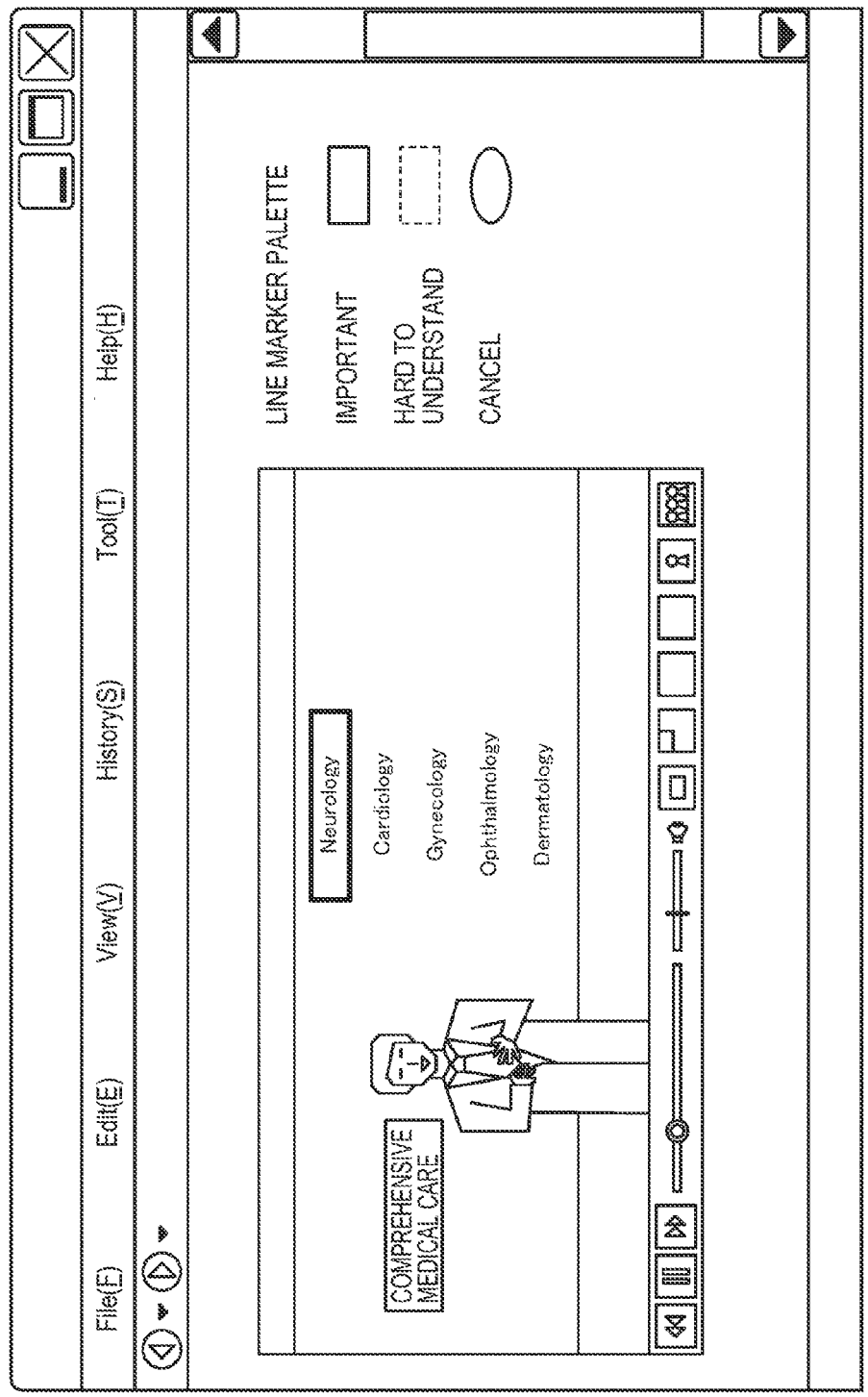
FIG. 13 is a diagram illustrating a display screen with the thickness of marker borders varied according to an attention degree.

Referring to FIG. 13, there is shown a part of the video in which the thickness of the marker border is varied according to the attention degree. The marker on the observer's left is added by a small number of users and therefore the border is thin and indicates that the attention degree is not so high. The marker on the observer's right is added by a large number of users and therefore the border is thick and indicates that the attention degree is high.

The thickness of the border is used here, but the indication method is not limited thereto. The attention degree may be indicated by the dark and light coloring of the marker or the like, and any other method may be used as long as the user is able to identify the attention degree.

The method of varying the border thickness does not require the change of the color of the semitransparent portion of the marker and therefore has an advantage that the characters or the like in the marked portion is not invisible.

If there are only a few markers, the number of markers obtained by totalizing is small. Therefore, the credibility of the number of markers is low. It is possible, however, to present the attention degree to the user with high credibility by displaying the marker with the border thickness or the like as the attention degree on the UI. In addition, for a simple cluster analysis, the cluster is likely to cover the entire screen. Therefore, the size of the marker is limited and the clustering is able to be performed on the basis of the limitation.

Figure 14:
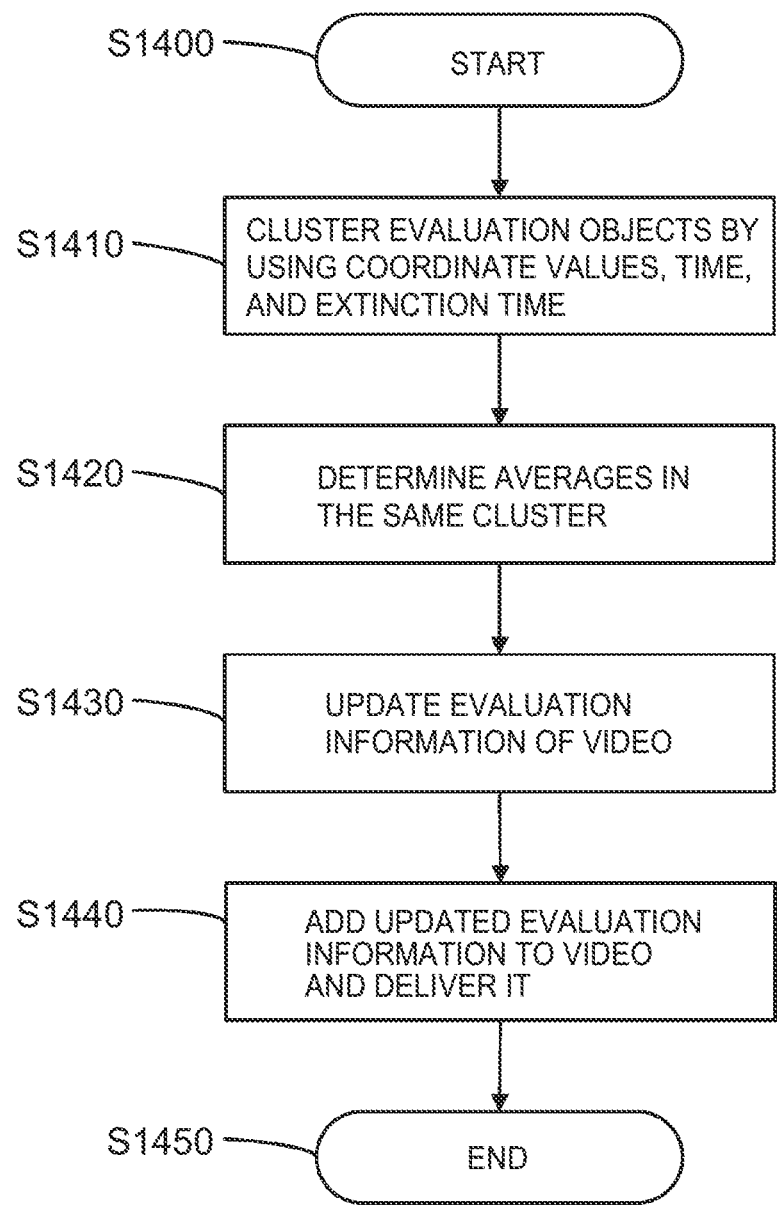
FIG. 14 is a flowchart illustrating clustering, updating evaluation information, and processing performed based on the updated evaluation information.

The clustering, updating evaluation information, and processing performed based on the updated evaluation information will be described in detail below with reference to the flowchart shown in FIG. 14. This processing is started in step 1400 after the extinction time f is decided. In step 1410, clustering is performed by using the coordinate values R(x, y) of the starting point and the end point, the input time t, and the decided extinction time f included in the data input by the user as feature values to group the data close to each other in the feature space. This grouping is able to be performed by using any known clustering method described above.

Upon the completion of the clustering, a calculation is made to determine the averages of the feature values included in the evaluation objects clustered in the same cluster in step 1420. More specifically, the calculation is made to determine the average of the coordinate values of the starting point, the average of the coordinate values of the end point, the average of the input time, and the average of the extinction time. If there is any other evaluation point, the average of the evaluation point is also calculated and further the attention degree is also calculated as described above.

In step 1430, the respective averages calculated in this manner are stored as evaluation information into the storage unit 170 to update the evaluation information having been stored in the storage unit 170 until then. This process is performed for each cluster.

In step 1440, if the user transmits a request for displaying an evaluation result of a plurality of users to the server 10, the server 10 searches the evaluation information stored in the storage unit 170 to find out the marker to be displayed at that time, generates a marker by using the averages included in the searched evaluation information, adds the marker to the video, and causes the video with the marker to be delivered.

If the attention degree is included as the evaluation information, the attention degree is indicated by increasing the thickness of the marker border as described above. The thickness of the border may be increased or decreased according to the attention degree: the thickness of the border may be increased by a certain amount every time the attention degree increases by 0.1; or the thickness of the border may be increased by approx. 0.2 mm if the attention degree is less than 0.3, by approx. 0.3 mm if it is equal to or more than 0.3 and less than 0.5, and by approx. 0.4 mm if it is equal to or more than 0.5 and less than 0.7. These conditions are preset and the marker is able to be displayed according to the preset conditions.

The marker delivered in the step 1440 is ended by the stop of the addition and delivery of the marker in step 1450 when the current time reaches the calculated extinction time f. The video delivery is continued. Upon receiving an input again, the marker is displayed in the same manner and is extinguished at the extinction time, and the evaluation information is updated again.

Although the evaluation system and the method of controlling the marker display according to the present invention have been described in detail hereinabove with reference to the accompanying drawings, other embodiments, addition, modification, and deletion of the embodiments disclosed herein may be made as long as those skilled in the art can understand, and any such embodiments are within the scope of the present invention as long as having the operation and effect of the present invention.

Like numbers have be used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of evaluating a video using a marker, comprising:

receiving coordinate values specifying an evaluation range input for the video;

generating the marker using the coordinate values;
receiving, from a first user, evaluation data associated with the marker;
receiving, from a second user, evaluation data associated with the marker;
storing the received evaluation data from the first and second users;
transmitting the video, wherein
the transmitted video includes the marker,
the marker is modified based upon the received evaluation data from the first and second users, and
the evaluation data is not included in the transmitted video.

2. The method of claim 1, wherein
the modification to the marker based upon the received evaluation data from the first and second users is a change to a border of the marker.

3. The method of claim 2, wherein
the marker is a semitransparent rectangle.

4. The method of claim 1, wherein
the marker is modified based upon a calculated attention degree.

5. The method of claim 4, wherein
the calculated attention degree indicates a number of user paying attention to an evaluation range associated with the evaluation range input.

6. The method of claim 1, wherein
the evaluation data includes an evaluation level, and
the modification to the marker is based upon the evaluation level.

7. The method of claim 1, wherein
the marker is a semitransparent rectangle.

8. The method of claim 1, wherein
the modification to the marker is a change of color of the marker.

9. The method of claim 1, further comprising
determining a time in the video at which to extinguish the marker.

10. Within a system comprising a processor and a memory, a method of evaluating a delivered video using a marker comprising:
with the processor, generating a marker to evaluate the video, wherein the marker is superimposed and displayed on an evaluation range in the video from coordinate values specifying the evaluation range input, wherein the marker is added to the video, and wherein the video with the marker is delivered for presentation;

with the processor, generating an image in the evaluation range at predetermined intervals starting from the input time of the coordinate values;

with the processor, calculating a similarity between two images arranged in the order of time from the input time by comparing the two images, and determining whether the similarity is within an allowable range;

with the processor, selecting the time of one of the two images generated as an extinction time of the displayed marker in the case where the similarity is determined to be not within the allowable range;

with the processor, clustering evaluation objects, the evaluation objects comprising the coordinate values, the input time, and the extinction time as feature values, wherein the evaluation objects are clustered using the feature values; and with the processor, calculating the averages of the feature values included in the evaluation objects clustered in the same cluster, wherein generating the marker comprises generating the marker by using the averages, adding the marker to the video, and causing the video with the marker to be delivered, in response to a request for displaying an evaluation result of a plurality of users, wherein the evaluation objects include evaluation points, respectively;

calculating the averages comprises calculating an attention degree by calculating an average of the evaluation points included in the evaluation objects clustered in the same cluster and dividing the average of the evaluation points by a total evaluation point obtained by adding up the evaluation points included in all clusters; and generating the marker comprises changing the marker according to the attention degree, adding the changed marker to the video, and causing the video with the marker to be delivered.

* * * * *